United States Patent [19]

Ota

[11] 4,010,490
[45] Mar. 1, 1977

[54] VIDEO RECORDING AND REPRODUCING APPARATUS WITH CROSSTALK REDUCTION

[75] Inventor: Yoshihiko Ota, Yokohama, Japan

[73] Assignee: Victor Company of Japan, Limited, Yokohama, Japan

[22] Filed: Dec. 17, 1975

[21] Appl. No.: 641,433

[30] Foreign Application Priority Data

Dec. 19, 1974 Japan .............................. 49-146099

[52] U.S. Cl. ........................................ 358/4; 358/8
[51] Int. Cl.² .................... H04N 5/79; H04N 5/795
[58] Field of Search ............................... 358/4, 8, 6

[56] References Cited

FOREIGN PATENTS OR APPLICATIONS

1,787,005   7/1973   Germany ................................ 358/4

*Primary Examiner*—Robert L. Richardson

[57] ABSTRACT

A color video signal recording system comprises a frequency modulator for frequency modulating a carrier with a luminance signal separated from an input color video signal. A frequency converter converts a carrier chrominance signal separated from the input color video signal. The separation provides a frequency band which is lower than the band of the frequency modulated luminance signal. Video heads successively record a mixed signal formed by mixing the frequency modulated luminance signal and the frequency converted carrier chrominance signal. Recording is made along a plurality of parallel tracks on a magnetic recording medium. The frequencies $f1$ and $f2$ are applied alternately to the frequency converter every time that the video heads scans the tracks. The frequencies $f1$ and $f2$ are selected at respective values which satisfy the equation $f1 - f2 = (N/2)f_H$, where $N$ is an odd integer, and $f_H$ is the horizontal scanning frequency. The frequency of the frequency converted carrier chrominance signal, in the mixed signal recorded in each track, differs by $(N/2)f_H$ from the frequency recorded in an adjacent track. The system for reproducing a color video signal thus recorded comprises video heads for reproducing the signal thus recorded by the above recording system. The reproducing signal includes a demodulator for demodulating the frequency modulated luminance signal which is separated from the reproduced signal. A frequency converter reconverts the frequency converted carrier chrominance signal separated from the reproduced signal, with a signal for causing a different frequency conversion at every scanning of the video heads. The reconverted frequency always becomes the original carrier chrominance signal frequency. A comb filter passes only the normal carrier chrominance signal in the output of the frequency converter and removes the crosstalk components. A mixer mixes the output of the demodulator with the output of the comb filter and obtains a reproduced color video signal.

15 Claims, 13 Drawing Figures

VIDEO RECORDING AND REPRODUCING APPARATUS WITH CROSSTALK REDUCTION

BACKGROUND OF THE INVENTION

This invention relates generally to systems for recording and/or reproducing color video signals. More particularly, the invention relates to a color video signal recording and/or reproducing system wherein tracks are formed on a magnetic recording medium, in mutually close proximity and without guard bands therebetween. The recorded color video signals are reproduced in a manner which prevents generation of crosstalk between the closely disposed magnetic tracks.

Among video signal recording and/or reproducing systems known heretofore, there is one wherein video signals are successively recorded on a magnetic tape in a plurality of tracks which are inclined or oblique relative to the longitudinal direction of the tape. In general, beat disturbances will occur in a system of this type when the picture is reproduced, if the video head reproducing the picture does not scan the correct track. The head becomes offset from the originally recorded track (i.e. the head follows a displaced track or tracking deviation). Then it reproduces two adjacent tracks at the same time. Accordingly, in order to prevent this beat disturbances from occurring, heretofore the video signal have been recorded along tracks formed with unrecorded portions between them, or so-called "guard bands". These guard bands prevent the video head which is scanning one track from also simultaneously scanning an adjacent track, although the video head may undergo some tracking deviation.

However, in a system for recording video signals on tracks with guard bands left between the tracks in this manner, the portions of the magnetic medium forming the guard bands cannot be used for recording and reproducing of signals. For this reason, there is a poor efficiency in the utilization of the tape.

Accordingly, a proposed recording system tracks which are formed in close proximity to each other, sometimes records on without a leaving guard bands therebetween. This proposed system is supposed to improve the tape utilization efficiency. By this proposed system, the inclinations or azimuths of the respective gaps in two video recording heads are set so that they are inclined in mutually opposite directions with respect to the vertical direction. Consequently, mutually adjacent tracks on the tape are always scanned by video heads for reading different azimuth angles. For this reason, when one of the video heads is scanning a specific track, an adjacent track is also being reproduced. However, the azimuth loss is great and the reproduction level is low with respect to the signal of this adjacent track, whereby crosstalk can be reduced. However, in this recording and/or reproducing system, the effect of azimuth loss is smaller at the lower frequencies of the recorded signal. Consequently, crosstalk becomes great at these low frequencies. Particularly, there is crosstalk when the above described recording and/or reproducing system is applied to a system wherein a color video signal is separated into a carrier chrominance signal and a luminance signal. A frequency modulated luminance signal is obtained by frequency modulating a carrier wave with this luminance signal. A carrier chrominance signal is frequency converted to a band lower than that of this frequency modulated luminance signal, and then is mixed and multiplexed with it. The resulting multiplexed signal being recorded on a tape. Much crosstalk occurs with respect to the carrier chrominance signal which has been frequency converted to a low-frequency band. Consequently, a color picture of good quality cannot be obtained by this system. Accordingly, with the aim of solving this problem, a system has been proposed in which the gaps of two video heads have different azimuth angles. In addition, during recording the chrominance signal is removed during each horizontal scanning period (1H) in the recording signal.

However, in this system, there is a color burst signal only during every other 1H, in the processing of the reproduced chrominance signal in the reproducing system. For this reason, color stability cannot be attained with high precision with respect to time axis fluctuations.

SUMMARY OF THE INVENTION

Accordingly, it is a general object of the present invention to provide a novel and useful color video signal recording and/or reproducing system in which the above described difficulties are overcome.

Another and more specific object of the invention is to provide a system in which there are significant signal differences between mutually adjacent tracks on a recording tape. The color subcarrier frequencies of the low-band frequency converted carrier chrominance signals differ by N/2 times (wherein N is an odd number) for the adjacent tracks. The difference is relative to the horizontal scanning frequency of the color video signal in the recording and reproducing operations.

Still another object of the invention is to provide a system in which the above mentioned signal for frequency conversion is caused to frequency or phase lock with a horizontal synchronizing signal which is separated from an input color video signal or a reproduced color video signal or with a signal having a repetitive frequency which is equivalent to this horizontal synchronizing signal. Furthermore, recording and/or reproducing is carried out by causing the color subcarrier frequency to differ by N/2 times the horizontal scanning frequency of the color video signal during every track scanning period of the video heads.

Other objects and further features of the invention will be apparent from the following detailed description with respect to preferred embodiments of the invention when read in conjunction with the accompanying drawings.

DETAILED DESCRIPTION

Figure 1:
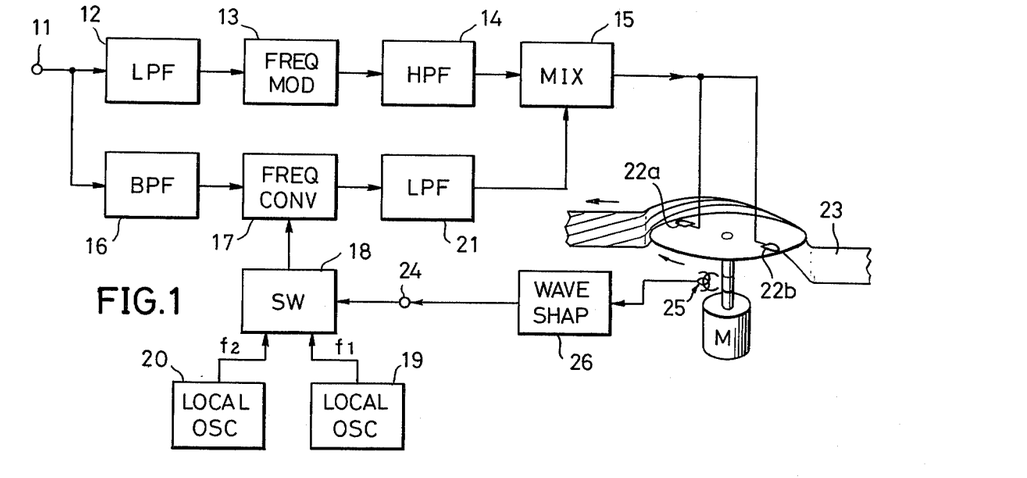
FIG. 1 is a block diagram showing the essential organization of the recording part of a first embodiment of the color video signal recording and/or reproducing system according to the invention.
Figure 2A:
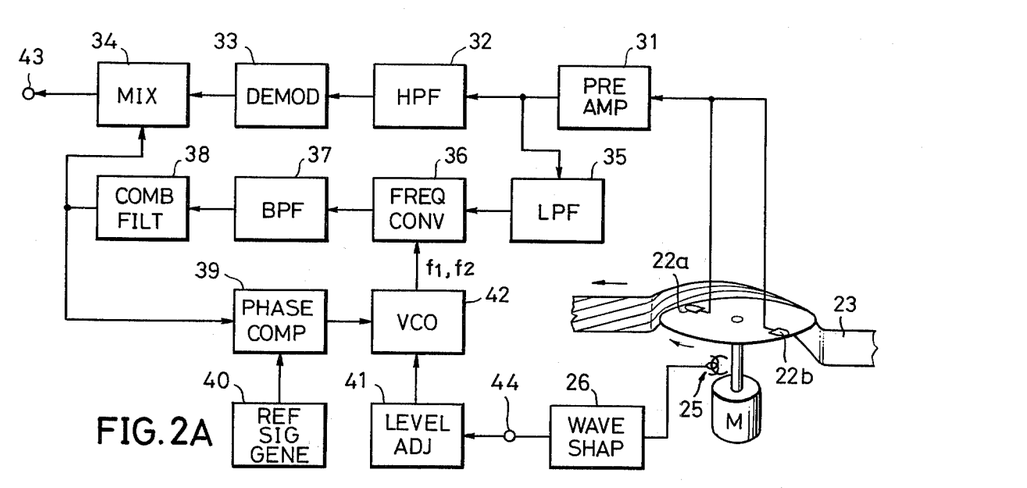
FIGS. 2A and 2B are respectively a block diagram of the reproducing part of the same first embodiment and a block diagram of a component part of this reproducing system.
Figure 2B:
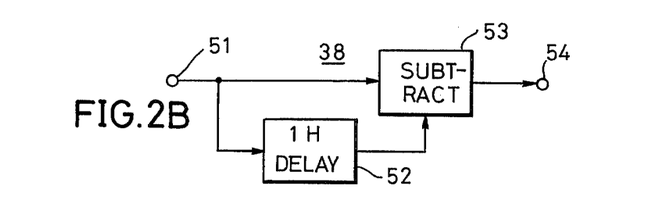

Referring first to FIGS. 1, 2A and 2B, the first embodiment of the color video signal recording and/or reproducing system according to the present invention will be described.

In the recording system shown in FIG. 1, a color video signal is introduced through an input terminal 11. Then it is fed to a low-pass filter 12 and a band-pass filter 16, and separated into a luminance signal and a carrier chrominance signal. The luminance signal has a frequency band of, for example, the order of lower than 3 MHz. This luminance signal is obtained out of the low-pass filter 12 and is supplied to a frequency modulator 13, where it frequency modulates a carrier wave. The undesired component of the frequency modulated luminance signal is removed by a high-pass filter 14. The frequency modulated luminance signal is thereafter supplied to a mixer 15.

The carrier chrominance signal is of a frequency band of the order of 3 MHz to 4 MHz, for example. It is taken from the output of the band-pass filter 16 and is supplied to a frequency converter 17 where it is frequency converted by a signal from a switching circuit 18. The conversion is to a frequency band which is lower than the band of the above mentioned frequency modulated luminance signal. A pulse detector produces a train of pulse signals in synchronization with the rotations of rotating video heads 22a and 22b. The train of pulse signals is wave shaped at a wave shaper 26 and thereafter supplied to the switching circuit 18 through a terminal 24. The train of pulse signals comprises a train of signals having voltages which are different in every period during which the rotating video heads 22a and 22b alternately scan each track on the magnetic tape 23, namely, in every one field period. This switch 18 operates during each period (e.g., each field period) while the video head 22a (22b) scans substantially one track of a tape 23. In response to the above mentioned pulse signal, the local oscillators 19 and 20 are changed over, alternately, to supply the output signals thereof to the frequency converter 17.

The output oscillation frequencies $f1$ and $f2$ of the local oscillators 19 and 20 differ from each other and are set at values which satisfy the following equation. N $$f1 - f2 = (N/2) \cdot f_H$$

where: $N$ is an odd integer, and $f_H$ is the horizontal scanning frequency of the video signal.

For example, if the color video signal is a color video signal of a NTSC system, the horizontal scanning frequency $f_H$ is approximately 15.734 KHz. Then, if $N=1$, $f1$ and $f2$ will be respectively selected at approximately 4149.912 KHz and approximately 4142.045 KHz, respectively.

As a consequence, the carrier chrominance signal supplied to the frequency converter 17 is frequency converted to 570.367 KHz and 562.500 KHz alternately by the above described frequencies $f1$ and $f2$ in each field period. This frequently converted to the low-carrier chrominance signal is passed through a low-pass filter 21 and then supplied to the mixer 15 to be mixed and multiplexed with the frequency modulated luminance signal. The resulting multiplexed signal is supplied to the video heads 22a and 22b, by which it is recorded alternately on the magnetic tape 23, forming tracks in a manner which leaves extremely narrow guard bands between adjacent tracks, or in a manner whereby the adjacent tracks are recorded in close proximity to each other without guard bands therebetween.

In the tracks thus recorded on the magnetic tape 23, the carrier chrominance signals are converted to a low-frequency band of adjacent tracks having frequencies which differ by $N/2$ times the horizontal scanning frequency $f_H$.

Two local oscillators 19 and 20 are used for obtaining the frequencies $f1$ and $f2$ in the above described embodiment. However, it is also possible to use only a single local oscillator which shifts its oscillation frequency during each field period. Still another alternative is to use a single fixed frequency, local oscillator and a frequency multiplier or a frequency divider. The two signals are then obtained directly from this local oscillator and from a signal obtained through the frequency multiplier or the frequency divider.

A signal recorded in the above described manner is reproduced by a reproducing system, illustrated in one embodiment by the block diagram in FIG. 2A.

A signal is reproduced alternately by video heads 22a and 22b from the magnetic tape 23 and is passed through a preamplifier 31 to a high-pass 32 and a low-pass filter 35. The signal is thereby separated into a frequency modulated luminance signal and a low-band frequency converted carrier chrominance signal.

The frequency modulated luminance signal thus separated is supplied to a demodulator 33, where it is demodulated. The luminance signal thus demodulated is supplied to a mixer 34.

On the other hand, the low-band frequency converted carrier chrominance signal thus separated is supplied to a frequency converter 36, where it is restored into a carrier chrominance signal having the original color subcarrier frequency (for example, 3.58 MHz in the case of a NTSC system color video signal) by a signal from a voltage-controlled oscillator (hereinafter referred to by the abbreviation VCO) 42. The carrier chrominance signal produced as output from the frequency converter 36 is sent to a band-pass filter 37, where an undesired component is removed. The resulting signal is supplied to a comb filter 38, where the crosstalk signal components from the adjacent tracks are removed.

Figure 3:
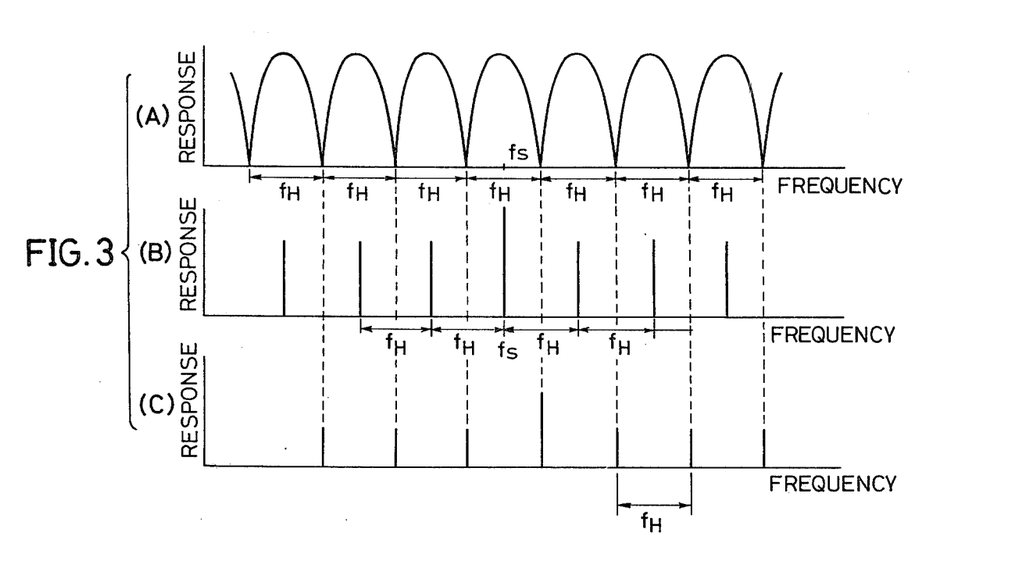
FIG. 3(A) is a graph indicating the filtering characteristic of a comb filter.
FIGS. 3(B) and 3(C) are graphical representations respectively of frequency spectrums of a color subcarrier and a crosstalk component.

Here, the comb filter 38 (FIG. 2B) comprises, an 1H delay circuit 52 for delaying an input reproduced carrier chrominance signal from a terminal 51 by one horizontal scanning period (1H) and a subtraction circuit 53. The carrier chrominance signal delayed by 1H, derived from the 1H delay circuit 52, is subtracted from the carrier chorminance signal entering through the terminal 51. This subtraction produces an output carrier chrominance signal at a terminal 54. The frequency characteristic of this comb filter 38 is as indicated in FIG. 3(A). This is a characteristic wherein, when the color subcarrier frequency is denoted by $f_s$, a frequency $f_s \pm nf_H$ (where $n$ is an integer including zero) is a passing frequency. A frequency $f_s \pm (N/2)f_H$ (where $N$ is one (unity) or greater odd integer) is a cut-off frequency.

A carrier chrominance signal reproduced from a specific track has a frequency spectrum, as indicated in FIG. 3(B). There is a color subcarrier of a frequency $f_s$, and, on both sides thereof as a center on the frequency axis, there are side bands at positions which are separated from every other horizontal scanning frequency $f_H$. As a consequence, a specific carrier chrominance signal passes through the comb filter 38 and is led out therefrom.

However, a carrier chrominance signal, which is a crosstalk component reproduced from a track adjacent to the reproduced track, has a frequency spectrum as indicated in FIG. 3(C). The frequency is offset by $(N/2)f_H$ relative to the frequency spectrum of the above mentioned specific carrier chrominance signal. Therefore, the frequency spectrum of this crosstalk component coincides with the cutoff frequency of the comb filter 38 and does not appear in the output of the comb filter 38.

The carrier chrominance signal whose crosstalk component has been thus removed by the comb filter 38 is supplied to the aforementioned mixer 34. There, it is mixed with the luminance signal from the demodulator 33. A reproduced color video signal is led out through an output terminal 43.

A color burst signal is derived from the output carrier chrominance signal of the above mentioned comb filter 38. The burst signal is supplied to a phase comparator 39, where it is phase compared with a signal of the same frequency as a reference color subcarrier frequency from a reference signal generator 40. The phase comparator 39 thereby produces an error output voltage of a level which varies in accordance with the resulting phase difference. This error voltage is supplied to control the the output frequency of VCO 42. As a result, irrespective of unwanted fluctuations in the time axis (which might arise from deviations in the tape travel, for example) the color subcarrier frequency of the reproduced carrier chrominance signal is continually caused to coincide with the output oscillation frequency of the reference signal generator 40. Thus, there is a phase stability of high precision is attained.

On the other hand, the pulse signals are derived from the pulse detector 25 in synchronization with the rotations of the video heads 22a and 22b. These pulses are wave shaped at the wave shaper 26, and thereafter supplied through a terminal 44 to a level adjuster 41, wherein the pulse signals are adjusted in level. Thus, level adjusted pulse signals are supplied to the VCO 42. The output oscillation frequency of the VCO 42 is switched during every field period. Therefore, the carrier chrominance signal being reproduced with a frequency differing by $(N/2) \cdot f_H$ during every succeeding field period, can carry out frequency conversion so that its frequency will continually remain the original specific color subcarrier frequency.

Next, a second embodiment of the system of the present invention will be described with reference to FIGS. 4 and 5.

Figure 4:
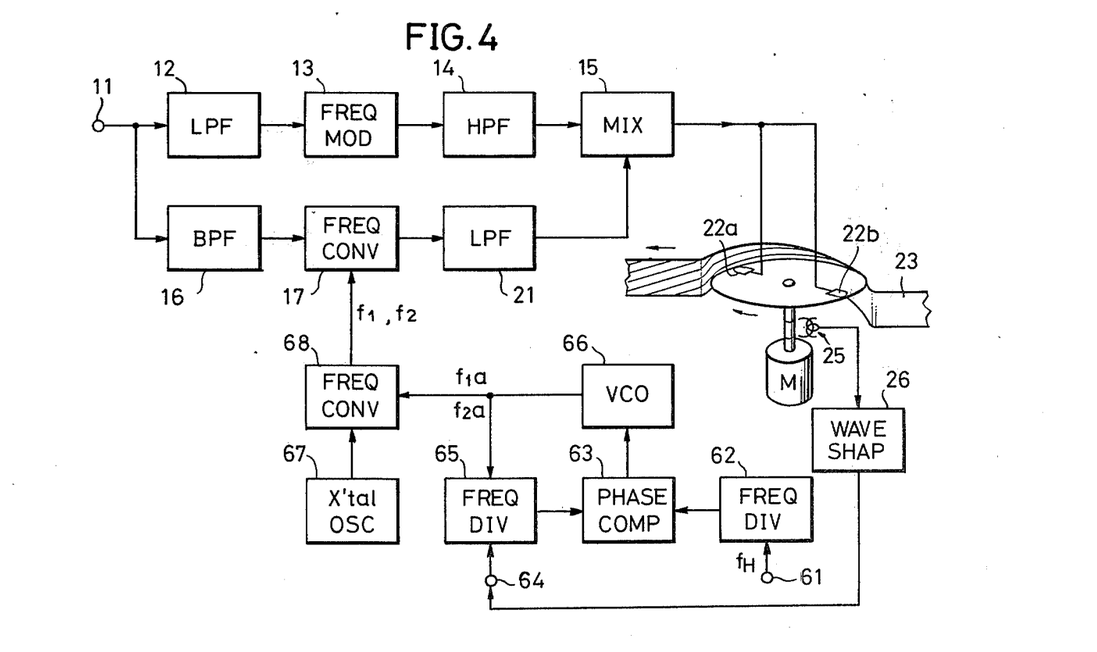
FIG. 4 is a block diagram of the recording part of a second embodiment of the color video signal recording and/or reproducing system according to the invention.

In the block diagram of the recording system shown in FIG. 4, parts which are the same as corresponding parts in FIG. 1 are designated by like reference numerals. Detailed description of such parts is therefore omitted.

A horizontal synchronizing signal is separated from an input video signal and is supplied through an input terminal 61 to a frequency divider 62. There its frequency $f_H$ is divided by one-fourth, and it is then supplied to a phase comparator 63. Pulses obtained in synchronization with the rotation of the video heads 22a and 22b are applied through an input terminal 64 to a frequency divider 65. These pulses switch the frequency dividing ratio thereof, for example, to 1/143 and 1/145 every scanning period (one field period) of the video heads. A voltage controlled oscillator (VCO) 66, which is supplied with the output of the phase comparator 63, produces output signals which alternate with frequencies $f1a$ and $f2a$ during each field period. These output signals are frequency divided by the frequency divider 65 so that their frequencies become a frequency $(f_H/4)$, which is substantially equal to each other and are then supplied to the phase comparator 63.

The phase comparator 63 compares the phases of the outputs of the frequency dividers 62 and 65. In accordance with the resulting output error voltage thereof, comparator 63 thus controls the oscillation frequency of the VCO 66. Here, the VCO 66 operates in a manner which locks it with the output of the phase comparator 63. For this reason, the oscillation frequency is so controlled and switched that, as the frequency divider 65 is switched with the frequency dividing ratios 1/143 and 1/145 responsive to pulses supplied through the terminal 64, as described above, the output of the frequency divider becomes substantially $f_H/4$, irrespective of this switching of the frequency dividing ratios. As a consequence, the VCO 66 alternately generates two different frequencies $f1a$ and $f2a$ at every scanning period of the video heads.

The outout signals of frequencies $f1a$ and $f2a$ from the VCO 66 are also supplied to a frequency converter 68 for conversion responsive to a signal of a reference frequency of 3579.545 KHz from a crystal oscillator 67. From the frequency converter 68, a signal of a frequency $f1$ and a signal of a frequency $f2$ are alternately obtained during every field period and are supplied to the frequency converter 17. In this system, the difference between the frequencies $f1$ and $f2$ is selected at $(N/2)f_H$, similarly as in the preceding embodiment.

If the input color video signal is a color video signal of a NTSC system, for example, the horizontal scanning frequency $f_H$ is substantially 15.734 KHz. The output signal frequencies $f1a$ and $f2a$ of the VCO 66 are respectively 562.500 Khz and 570.367 KHz, for example. The output signal frequencies $f1$ and $f2$ of the frequency converter 68 are respectively 4142.045 KHz and 4149.912 KHz, for example.

In the instant emobdiment, the signals $f1$ and $f2$ are supplied to the frequency converter 17 for frequency conversion. These signals are obtained responsive to a horizontal synchronizing signal separated from the input video signal. For this reason, if there is an error in the horizontal synchronizing signal frequency in the input video signal, the carrier chrominance asignal is also frequency converted with the same error rate. Therefore, the horizontal synchronizing signal and the carrier chrominance signal are recorded with a continually constant relationship.

Figure 5:
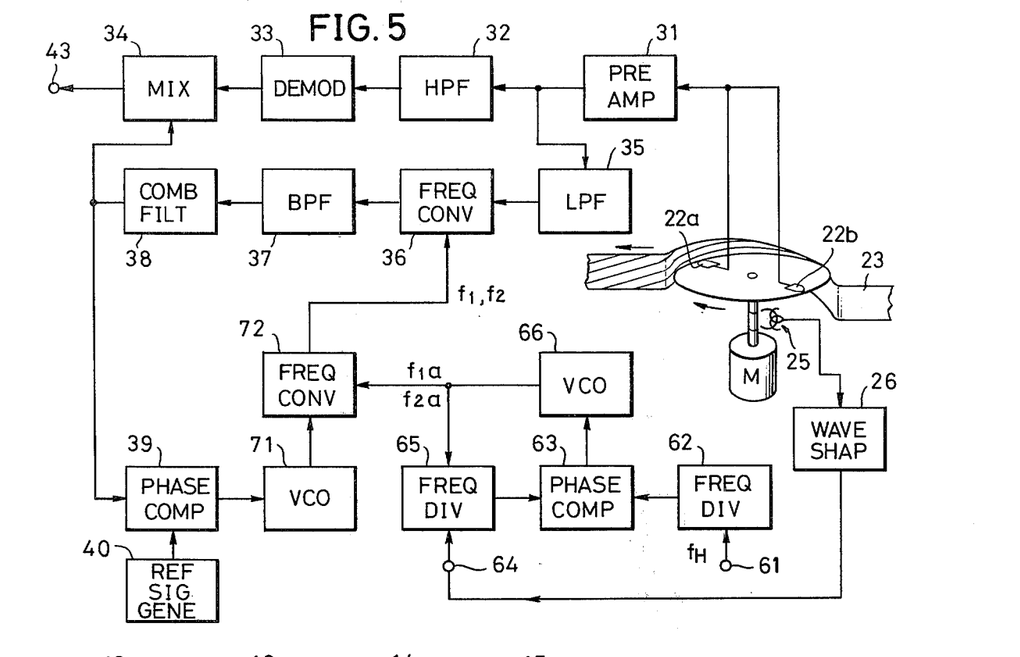
FIG. 5 is a block diagram of the reproducing part of the same second embodiment.

An embodiment of a system for reproducing signals, recorded in the above described manner, is illustrated by block diagram in FIG. 5. In FIG. 5, parts which are the same as corresponding parts in FIGS. 2A and 4 are designated by like reference numerals. Therefore, these parts will not be described in detail again.

The output error voltage of the phase comparator 39 is supplied to a voltage controlled oscillator (VCO) 71 to control the oscillation frequency (3579.545 KHz) thereof. The output signal of this VCO 71 is supplied to a frequency converter 72 and is frequency converted with the signals of frequencies $f1a$ and $f2a$ from the VCO 66. Signals of frequencies $f1$ and $f2$ are obtained alternately during every field period from the frequency converter 72 and are supplied to the frequency converter 36.

In this reproducing system, a horizontal synchronizing signal, separated from the reproduced video signal, is supplied through the terminal 61 to the frequency divider 62. Consequently, the reproduced carrier chrominance signal is frequency converted responsive to signals $f1$ and $f2$ for frequency conversion responsive to a horizontal synchronizing signal separated from the reproduced video signal. For this reason, frequency fluctuations are effectively eliminated in the reproduced low-frequency of the converted carrier chrominance signal. These fluctuations occur for every track scanning of the video heads and are due to fluctuations of the relative speeds fluctuations of the tape 23 and the video heads 22a and 22b.

Therefore, a stable reproduced video signal can be obtained without the so-called color losing caused by erroneous color locking. Furthermore, since the above mentioned frequency fluctuation is effectively eliminated, the range of the fluctuation of the output oscillation frequency of the VCO 71 is very small. An element having a good temperature characteristic, such as crystal, can be used for the oscillation element of the VCO 71.

Figure 6:
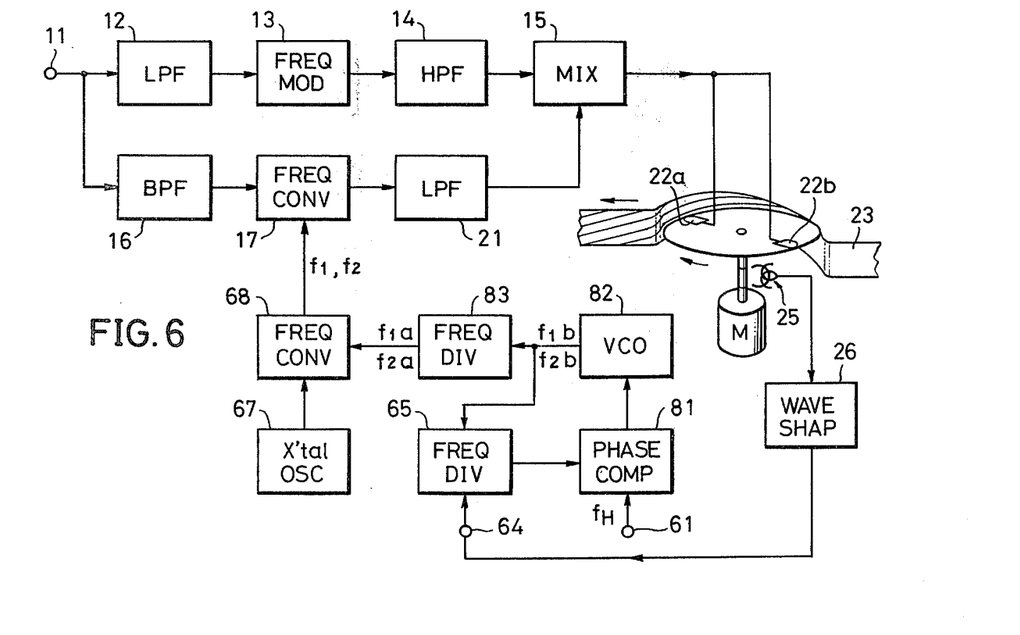
FIG. 6 is a block diagram of the recording part of a third embodiment of the color video signal recording and/or reproducing system according to the invention.
Figure 7:
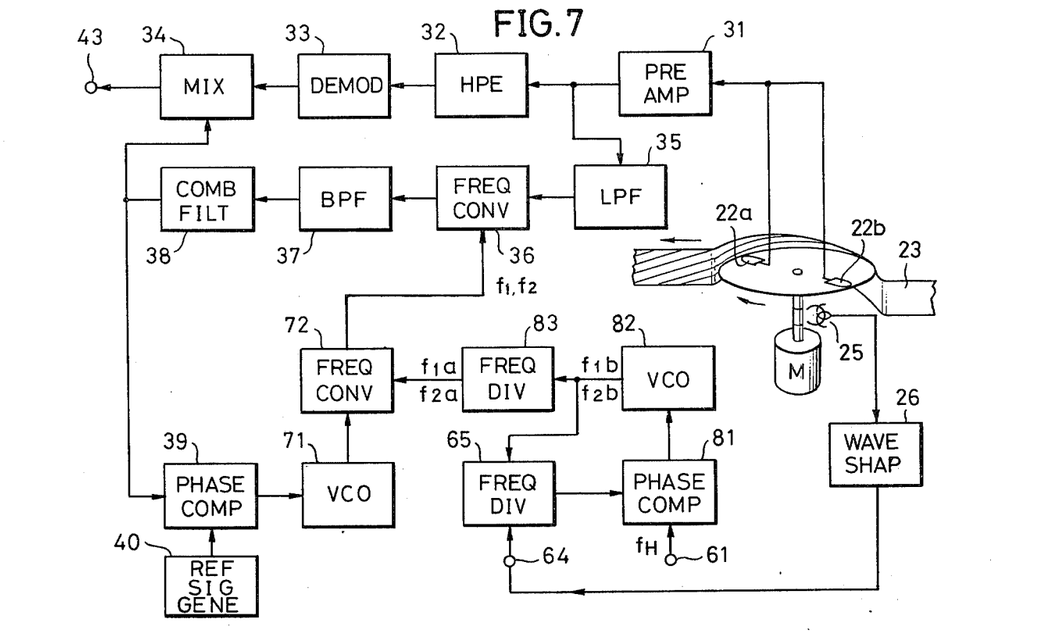
FIG. 7 is a block diagram of the reproducing part of the same third embodiment.

A third embodiment of the system of the invention will now be described with reference to FIGS. 6 and 7. In the block diagram shown in FIG. 6, parts which are same as corresponding parts in FIGS. 1 and 4 are designated by like reference numerals. Detailed description of these parts will not be repeated.

A phase comparator 81 receives a signal from the frequency divider 65 and from a horizontal synchronizing signal, obtained by separation, from the input video signal introduced through the terminal 61. The resulting output error voltage of this phase comparator 81 is supplied to a voltage controlled oscillator (VCO) 82 to control the oscillation frequency thereof. This VCO 82 produces output signals of frequencies $f1b$ and $f2b$ alternating every field period, which signals are frequency divided by a frequency divider 83. Their frequencies are frequency divided into 1/4 and rendered respectively into $f1a$ and $f2a$. These signals are then supplied to the frequency converter 72. In the instant embodiment the other blocks, and their operation, are the same as those of corresponding blocks in the recording system described hereinbefore and illustrated in FIG. 4. Therefore, they will not be described again. An embodiment of a system for reproducing signals recorded in the above described manner is illustrated by the block diagram in FIG. 7. Again, those parts in FIG. 7 which are the same as the corresponding parts in FIGS. 2A, 5, and 6 are designated by like reference numerals, and will not be described again. Since the organization and operation of the reproducing system shown in FIG. 7 can be readily understood from the preceding description set forth with reference to FIGS. 5 and 6, description thereof will be omitted. It should be mentioned that a horizontal synchronizing signal separated from the reproduced video signal is supplied to the terminal 61.

In this third embodiment of the invention, the phase comparison frequency in the phase comparator 81 is four times that in the phase comparator 63 of the second embodiment, since the frequency divider 62 is not provided. For this reason, the phase comparison accuracy is better than that in the second embodiment.

Furthermore, in this third embodiment, a frequency divider 83 is adapted to divide a frequency by ¼ while the frequency divider 65 is adapted to divide a frequency into 1/72 and 173. In this case, the oscillation frequencies of the crystal oscillators 67 and the VCO 71 are set at 3575.621 KHz. In this case, the output oscillation frequencies $f1b$ and $f2b$ of the VCO 82 becoeme 1132.848 KHz and 1148.582 KHz, respectively. The output signal frequencies $f1a$ and $f2a$ of the frequency divider 83 become 566.424 KHz and 574.291 KHz, respectively. Furthermore, the output signal frequencies $f1$ and $f2$ of the frequency converter 72 become 4142.045 KHz and 4149.912 KHz, respectively. If frequencies are selected as indicated above, the frequency dividing ratios of the frequency dividers 83 and 65 are small. For this reason, the number of bits may be small, and the circuits of the frequency dividers 83 and 65 are simple.

Instead of the horizontal synchronizing signal applied to the terminal 61, a signal may be used which has a repetitive frequency equivalent thereto, for example, such a signal may be obtained by shaping a color burst signal.

Embodiments of specific electrical circuits, in concrete form, of essential parts of the block systems in the above described embodiments of the invention will now be described.

Figure 8:
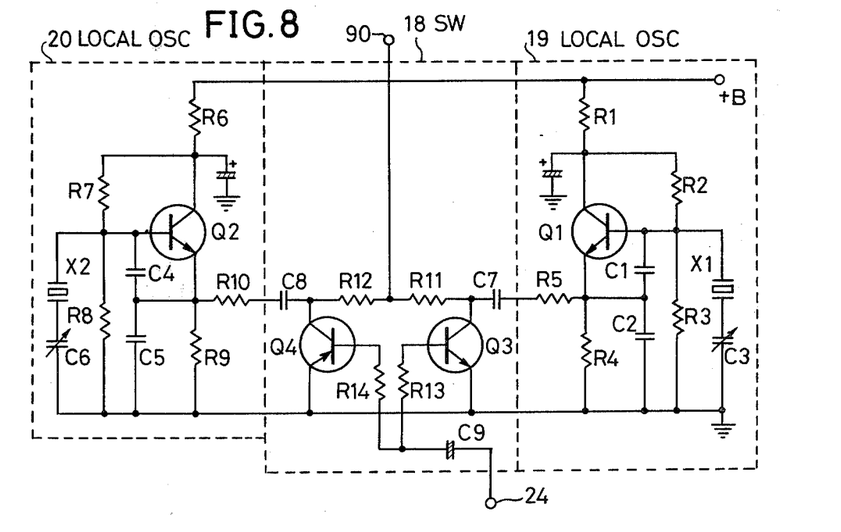
FIG. 8 is a schematic circuit diagram, in concrete form, of the essential parts of the system shown by block diagram in FIG. 1.

FIG. 8 is a circuit diagram showing the circuits of the switching circuit 18 and the local oscillators 19 and 20, for use in the recording system shown by block diagram in FIG. !. The parts in FIG. 8 corresponding to these circuits are enclosed within broken-line boxes, which are designated by like reference numerals.

The local oscillator 19 comprises a transistor Q1, resistors R1 through R5, capacitors C1, C2, and C3, and a crystal oscillating element X1, all connected as shown. The circuit oscillates at a frequency $f1$ of 4149.912 KHz. The local oscillator 20 comprises a transistor Q2, resistors R6 through R10, capacitors C3 through C6, and a crystal oscillating element X2, all connected as shown. This circuit oscillates at a frequency $f2$ of 4142.045 KHz. The switching circuit 18 comprises transistors Q3 and Q4, resistors R11 through R14, and capacitors C7, C8, and C9, all connected as shown. A pulse signal is obtained from the pulse detector 25 and is applied through the terminal 24 to the bases of the NPN transistor Q3 and the PNP transistor Q4 respectively. The transistors Q3 and Q4 alternately become conductive and nonconductive at each scanning period of the video heads, in accordance with the high level and low level of the pulse signal from detector 25. As a consequence, frequencies $f1$ and $f2$ are alternately led out at every scanning period through a terminal 90 connected to the junction between the resistors R11 and R12. The signal obtained through the terminal 90 is supplied to the frequency converter 17.

Figure 9:
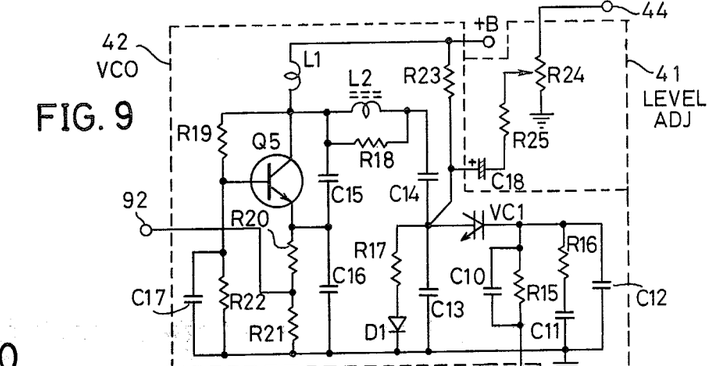
FIG. 9 is a schematic circuit diagram, in concrete form, of the essential parts of the system shown by block diagram in FIG. 2A.

FIG. 9 shows an embodiment of a specific circuit organization, in concrete form, for the level adjuster 41 and the VCO 42 in the reproducing system shown in block form in FIG. 2A.

The output error signal of the phase comparator 39 is passed through a terminal 91 and through a filter comprising a resistor R15 and a capacitor C10. There, the error signal acquires a time constant and is applied to one terminal of a varicap diode VC1 as a operating voltage thereof. Pulses which are in synchronism with the rotation of the video heads have levels which are adjusted by the level adjuster 41 comprising resistors R24 and R25 and a capacitor C18. These pulses are applied through the terminal 44 to the other terminal of the varicap diode VC1. The capacitance of this varicap diode VC1 varies with the voltage applied to the both ends thereof. The oscillation frequency of the VCO 42 varies. This VCO 42 comprises a transistor Q5, resistors R15 through R23, capacitors C10 through C17, coils L1 and L2, a diode D1, and the varicap diode VC1. As a result, the VCO 42 oscillates alternately at frequencies of 4149.912 KHz and 4142.045 KHz in accordance with the pulse signal from the terminal 44. These two oscillation frequencies are led out through a terminal 92 and supplied to the frequency converter 36.

Figure 10:
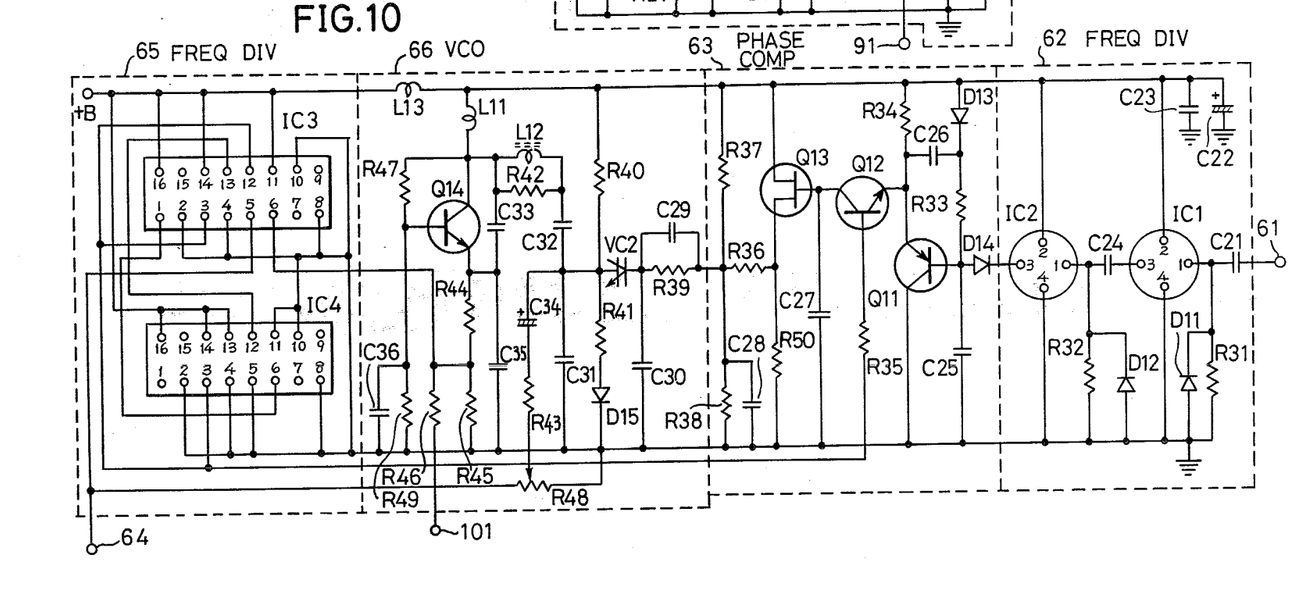
FIG. 10 is a schematic circuit diagram, in concrete form, of the essential parts of the systems shown by block diagrams in FIGS. 4 and 5.

FIG. 10 shows a specific embodiment of the circuits, in concrete form, of the frequency dividers 62, and 65, the phase comparator 63, and the VCO 66 in the recording and reproducing systems shown by block diagram in FIGS. 4 and 5. In FIG. 10, the circuit parts corresponding to the above named components are enclosed within broken line boxes, which are respectively designated by the same reference numerals.

The frequency divider 62 comprises integrated circuits IC1 and IC2, each having therewithin a flip-flop circuit, resistors R31 and R32, capacitors C21 through C24, and adiodes D11 and D12. A horizontal synchronizing signal from the terminal 61 is frequency divided by one-half in the circuits IC1 and IC2, respectively that is, by one-fourth as a result. The signal thus divided is supplied to the phase comparator 63 comprising transistors Q11, Q12, and Q13, resistors R33 through R38 and R50, capacitors C25 through C28, and diodes D14 and D15. Transistor Q11 shapes the output signal from the frequency divider 62 into a signal of a trapezoidal waveform having a sloped rising edge, whereupon a wave to be sampled is formed. The transistor Q12 is a sample transistor and is operated responsive to a sample pulse which is applied to its base from the frequency divider 65 to sample a portion of the slope of the above mentioned trapezoidal waveform. The signal thus sampled is held by the succeeding field effect transistor (FET) Q13.

The output of the phase comparator 63 is applied as an operating voltage to one terminal of a varicap diode VC2 of the VCO 66. This VCO 66 comprises a transistor Q14, resistors R39 through R49, capacitors C29 through C36, coils L11 and L12, the varicap diode VC2, and a diode D15. To the other terminal of the varicap diode VC2 are applied pulses synchronized with the rotation of the video heads and introduced through the terminal 64. The capacitance of this varicap didode VC2 varies alternately in accordance with the pulses thus applied.

As described in conjunction with FIG. 4, the VCO 66 locks with the output of the phase comparator 63. For this reason, the frequency division ratio of the frequency divider 65 is switched by the pulses which are synchronized with the rotation of the video heads, whereby the oscillation frequency of the VCO 66 is also switched. As a consequence, it is not necessary, as a matter of principle, to apply the pulses from the terminal 64 to the VCO 66. In the instant embodiment, however, these pulses are applied to the VCO 66 in order to obtain instantaneous switching of the oscillation frequency, with a good switching rise.

The frequency divider 65 comprises programmable counters IC3 and IC4 in the form of integrated circuits. Pulses which are synchronized with the rotation of the video heads are applied from the terminal 64 to the fifth pin of the programmable counter IC3. These programmable counters IC3 and IC4 are so adapted that the frequency division ratio will become 1/145 when the above mentioned pulses are of low level and will become 1/143 when the pulses are of high level. Therefore, the alternating frequency from the VCO 66 is continually divided to become approximately 3.9335 Khz ($f_H/4$) in the frequency divider 65 and thus supplied to the phase comparator 63.

Further, this invention is not limited to these embodiments. Many various variations and modifications may be made without departing from the scope and spirit of the invention.

What is claimed is:
1. A color video signal recording system comprising:
means for separating an input color video signal into a luminance signal and a carrier chrominance signal;
means for frequency modulating a carrier wave responsive to the separated luminance signal;
first frequency conversion means responsive to the separated carrier chrominance and wave signals for frequency converting the separated carrier chrominance signal into a band which is lower than the band of the frequency modulated luminance signal;
means for mixing the frequency modulated luminance signal and the frequency converted carrier chrominance signal;
means for recording the mixed signals in a plurality of parallel tracks on a recording medium; and
first signal supplying means for producing the wave signals alternately having frequencies $f1$ and $f2$ each time that the recording means scans one of the tracks and for supplying the wave signals to said first frequency conversion means;
the values of the frequencies $f1$ and $f2$ satisfying the equation $f1 - f2 = (N/2)f_H$, where $N$ is an odd integer, and $f_H$ denotes the horizontal scanning frequency of the video signal.

2. A color video signal recording system as claimed in claim 1 in which the first signal supplying means comprises first oscillation means for generating a signal of the frequency $f1$, second oscillation means for generating a signal of the frequency $f2$, and means for switching and alternately supplying the signals of the frequencies $f1$ and $f2$ to the first frequency conversion means each time that the recording means scans one of the tracks.

3. A color video signal recording system as claimed in claim 1 in which the recording means comprises one or more rotating video heads, and means for deriving a pulse signal which is synchronized with the rotation of the rotating video heads, and means responsive to said pulse signal for switching the frequency of the frequency conversion in the first signal supplying means.

4. A color video signal recording system as claimed in claim 1 in which the first signal supplying means includes a first frequency divider which is switched alternately between mutually different frequency dividing ratios each time that the recording means scans one of the tracks, a second frequency divider means responsive to a signal of the horizontal scanning frequency of the input video signal or to a frequency equivalent thereto for dividing the frequency of the horizontal scanning frequency, a phase comparator means for receiving and comparing the phases of the outputs of the first and second frequency dividers, and a voltage controlled oscillator means responsive to the output of the phase comparator for generating a frequency controlled by said output, the oscillation frequency of the voltage controlled oscillator being switched in correspondence with the switching of the frequency dividing ratio of the first frequency divider.

5. A color video signal recording system as claimed in claim 4 in which the first signal supplying means further includes a reference frequency signal oscillator, and a frequency converter means for converting the frequency of the output signal from the voltage controlled oscillator responsive to the reference frequency signal and for producing output signals of the frequencies $f1$ and $f2$.

6. A color video signal recording system as claimed in claim 1 in which the signal supplying means for making the first frequency conversion includes a first frequency divider which is switched alternately between mutually different frequency dividing ratios each time that the recording means scans the tracks, a phase comparator means for receiving and phase comparing the output of the first frequency divider and a signal of the horizontal scanning frequency of the video signal or of a frequency equivalent thereto, a voltage controlled oscillator means responsive to the output of the phase comparator means for generating a frequency controlled by said output, and a second frequency divider means for dividing the frequency of the output of the voltage controlled oscillator means, the frequency of the voltage controlled oscillator being switched in correspondence with the switching of the frequency dividing ratio of the first frequency divider.

7. A color video signal recording system as claimed in claim 6 in which the first signal supplying means further includes a reference frequency signal oscillator means and a frequency converter means for converting the frequency of the output of the voltage controlled oscillator responsive to the reference frequency signal and for producing output signals of frequencies $f1$ and $f2$.

8. A system for reproducing a video signal recorded by the system as claimed in claim 1, said reproducing system comprising:
means for reproducing from the successive tracks the mixed signals recorded on the recording medium;
means for separating the reproduced signals into a frequency modulated luminance signal and a frequency converted carrier chrominance signal;
means for demodulating the separated frequency modulated luminance signal;
second frequency conversion means for re-converting the separated frequency converted carrier chrominance signal thus to restore the carrier chrominance signal of the original band;
second signal supplying means for alternately supplying signals of the frequencies $f1$ and $f2$ into the second frequency conversion means each time the reproducing means scans and reproduces one of the tracks;
filter means for removing crosstalk components from tracks which are adjacent a reproduced track responsive to the carrier chrominance signal which is restored to the original band and for passing only the predetermined carrier chrominance signal; and
means for mixing the demodulated luminance signal with the carrier chrominance signal which has passed through the filter means and for deriving a mixed signal as a reproduced color video signal,
the frequency converted carrier chrominance signal which is reproduced and separated being of a different frequency in each adjacent track that can be reproduced during any scanning period, said chrominance signal always being restored to the same original carrier chrominance frequency in the second frequency conversion means.

9. A reproducing system as claimed in claim 8 in which the filter means comprises a comb filter.

10. A reproducing system as claimed in claim 8 in which the second signal supplying means comprises means for generating a pulse signal in synchronization with the scanning of the tracks by the reproducing means, and a voltage controlled oscillator means for oscillating alternately with the frequencies $f1$ and $f2$ responsive to the pulse signal.

11. A reproducing system as claimed in claim 10 in which the second signal supplying means further comprises an oscillator means for generating a reference signal, and a phase comparator means responsive to a color burst signal separated from the output of the filter means and to the reference signal for comparing the phase of the two signals and supplying the resulting output signal to the voltage controlled oscillator means.

12. A color video signal reproducing system as claimed in claim 8 in which the second signal supplying means includes a third frequency divider means which is switched alternately between two mutually different frequency dividing ratios each time that the reproducing means scans one of the tracks, a fourth frequency divider means responsive to either a signal of the horizontal scanning frequency of the reproduced video signal or a frequency equivalent thereof for dividing the frequency of the signal thus supplied, a phase comparator means for receiving and phase comparing the outputs of the third and fourth frequency dividers, and a voltage controlled oscillator means responsive to the output of the phase comparator for generating a frequency controlled by said output, the frequency of the voltage controlled oscillator means being switched in correspondence with the switching of the frequency dividing ratio of the third frequency divider.

13. A color video signal reproducing system as claimed in claim 12 in which the second signal supplying means further includes a reference frequency signal oscillator means and a frequency converter for converting the frequency of the output signal of the voltage controlled oscillator means responsive to the reference frequency signal and for producing output signals of the frequencies $f1$ and $f2$.

14. A color video signal reproducing system as claimed in claim 8 in which the second signal supplying means includes a third frequency divider means which is switched alternately between at least two mutually different frequency dividing ratios each time that the reproducing means scans one of the tracks, a phase comparator means for receiving and phase comparing the output of the third frequency divider means and of a signal of the horizontal scanning frequency in either the reproduced video signal or in a frequency equivalent thereto, a voltage controlled oscillator means responsive to the output of the phase comparator for generating an oscillation frequency controlled by said output, and a fourth frequency divider means for dividing the frequency of the output of the voltage controlled oscillator means, the oscillation frequency of the voltage controlled oscillator means being switched in correspondence with the switching of the frequency dividing ratio of the third frequency divider means.

15. A color video signal reproducing system as claimed in claim 14 in which the second signal supplying means further includes a reference frequency signal oscillator means and means for converting the frequency of the output signal of the voltage controlled oscillator means responsive to the reference frequency signal and for producing frequencies $f1$ and $f2$ as output signals.

* * * * *